US012726057B2

(12) United States Patent
Yang et al.

(10) Patent No.: US 12,726,057 B2
(45) Date of Patent: Sep. 1, 2026

(54) FAN MOTOR AND HAIR DRYER COMPRISING SAME

(71) Applicant: LG ELECTRONICS INC., Seoul (KR)

(72) Inventors: Giyeob Yang, Seoul (KR); Cheol Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 777 days.

(21) Appl. No.: 18/016,205

(22) PCT Filed: Dec. 15, 2020

(86) PCT No.: PCT/KR2020/018319
§ 371 (c)(1),
(2) Date: Jan. 13, 2023

(87) PCT Pub. No.: WO2022/025363
PCT Pub. Date: Feb. 3, 2022

(65) Prior Publication Data

US 2023/0291250 A1 Sep. 14, 2023

(30) Foreign Application Priority Data

Jul. 28, 2020 (KR) ........................ 10-2020-0094005

(51) Int. Cl.
*A45D 20/12* (2006.01)
*H02K 1/20* (2006.01)
(Continued)

(52) U.S. Cl.
CPC ............... *H02K 1/20* (2013.01); *A45D 20/12* (2013.01); *H02K 7/083* (2013.01); *H02K 9/06* (2013.01)

(58) Field of Classification Search
CPC ............. H02K 1/20; H02K 9/06; H02K 7/083
See application file for complete search history.

(56) References Cited

U.S. PATENT DOCUMENTS 5,841,943 A * 11/1998 Nosenchuck .......... A45D 20/10 34/97
2004/0094290 A1 * 5/2004 Lopatinsky ........... H01L 23/467 165/122
(Continued)

FOREIGN PATENT DOCUMENTS

CN 207782511 U 8/2018
CN 209516803 U * 10/2019
(Continued)

OTHER PUBLICATIONS

CN-209516803-U Machine Translation (Year: 2019).*

*Primary Examiner* — Oluseye Iwarere
*Assistant Examiner* — Masoud Vaziri
(74) *Attorney, Agent, or Firm* — Birch, Stewart, Kolasch & Birch, LLP

(57) ABSTRACT

Disclosed is a fan motor and a hair dryer comprising same, the fan motor having heat-dissipating holes for discharging heat from inside the fan motor. Heat-dissipating channels are provided in the space between the inner circumferential surface of a stator assembly and two adjacent teeth, and a plurality of heat-dissipating holes penetrate the top of a vane hub, wherein the heat-dissipating holes overlap unidirectionally with any one of the heat-dissipating channels.

20 Claims, 11 Drawing Sheets

(51) Int. Cl.

| | |
|---|---|
| ***H02K 7/08*** | (2006.01) |
| ***H02K 9/06*** | (2006.01) |

(56) References Cited

U.S. PATENT DOCUMENTS

| | | | | |
|---|---|---|---|---|
| 2008/0116753 | A1* | 5/2008 | Carlucci | H02K 7/145<br>388/816 |
| 2017/0005546 | A1* | 1/2017 | Chou | H02K 5/225 |
| 2018/0266426 | A1* | 9/2018 | Lee | F04D 29/403 |
| 2020/0400157 | A1* | 12/2020 | Tsuchida | F04D 25/0646 |

FOREIGN PATENT DOCUMENTS

| | | | |
|---|---|---|---|
| EP | 3 056 738 | B1 | 3/2020 |
| JP | 2017-17983 | A | 1/2017 |
| JP | 2018-84151 | A | 5/2018 |
| JP | 2019-54671 | A | 4/2019 |
| KR | 10-2009-0123209 | A | 12/2009 |
| KR | 10-2018-0105934 | A | 10/2018 |
| KR | 10-2019-0003259 | A | 1/2019 |
| KR | 10-2090641 | B1 | 3/2020 |

* cited by examiner

FAN MOTOR AND HAIR DRYER COMPRISING SAME

CROSS REFERENCE TO RELATED APPLICATIONS

This application is the National Phase of PCT International Application No. PCT/KR2020/018319, filed on Dec. 15, 2020, which claims priority under 35 U.S.C. 119 (a) to Patent Application No. 10-2020-0094005, filed in the Republic of Korea on Jul. 28, 2020, all of these applications being hereby expressly incorporated by reference into the present application.

TECHNICAL FIELD

The present disclosure relates to a fan motor and a hair dryer including the same, and more particularly, to a fan motor having heat-dissipating holes for dissipating heat inside the fan motor and a hair dryer including the same.

BACKGROUND ART

A hair dryer denotes an electronic device that dries wet hair with cold or warm air. Specifically, a hair dryer applies cold or warm air to wet hair to accelerate evaporation of water particles remaining on the hair, thereby drying the hair.

The hair dryer includes therein a fan motor that a fan is attached to a shaft of a small motor. When electric energy is supplied to the hair dryer, the fan motor is driven and air is suctioned into the hair dryer from outside of the hair dryer. The suctioned air passes through the fan motor and is discharged through an air outlet of the hair dryer.

A speed at which air is discharged from the hair dryer is proportional to a rotational speed of the fan motor. At this time, as the speed at which the air is discharged from the hair dryer increases, a hair drying speed and an effect thereof further increase. Therefore, as the rotational speed of the fan motor becomes faster, the hair drying speed and the effect thereof increase much more.

However, when the rotational speed of the fan motor increases, an amount of heat generated by the fan motor also increases. The heat generated by the fan motor causes damage to the fan motor and deterioration in performance.

In particular, in the case of a fan motor belonging to a three-phase motor, a coil of the fan motor is enclosed inside another structure. From the perspective of the motor, this causes a difficulty in cooling the coil by supplied air.

Furthermore, the fan motor belonging to the three-phase motor uses an axial fan to increase an air volume. Therefore, since an impeller and a vane are located on a straight line in an axial direction, a channel (flow path, passage) space through which air can enter the fan motor is not sufficiently formed.

Accordingly, it may be considered to develop a fan motor capable of effectively dissipating heat generated therein while maintaining a rotational speed, and a hair dryer including the fan motor.

Korean Patent Registration No. 10-2090641 discloses an electric motor. Specifically, an electric motor that includes a frame and a stator assembly, and a part of the stator assembly is exposed to outside of the fame to be cooled by external air is disclosed.

However, the type of cooling of the electric motor can cool only a motor having the structure in which the part of the stator assembly is exposed to the outside of the frame.

Therefore, a motor having a structure in which a stator assembly is fully surrounded by a frame cannot be cooled.

Korean Patent Publication No. 10-2009-0123209 discloses a motor cooling device for an electric power steering device. Specifically, a motor cooling device that includes an air circulation pipe and a heat-dissipating pin (heat radiation pin) for circulating internal air of the motor to outside using a rotational force of a fan is disclosed.

However, this type of motor cooling device can cool only a motor having a structure in which a housing encloses upper and side surfaces of the fan. In addition, in this type of motor cooling device, the air circulation pipe must be separately provided outside the housing. This makes it difficult to miniaturize the motor.

DISCLOSURE OF INVENTION

Technical Problem

One aspect of the present disclosure is to provide a fan motor capable of dissipating internal heat of a fan motor having a structure in which a coil is surrounded by other structures, and a hair dryer including the same.

One aspect of the present disclosure is to provide a fan motor capable of dissipating internal heat of a fan motor without a separate external power source, and a hair dryer including the same.

Still another aspect of the present disclosure is to provide a fan motor capable of preventing noise generation and deterioration in performance that are caused while air passed through an impeller is partially introduced directly into a stator, and a hair dryer including the same.

Solution to Problem

In order to achieve the above aspects and other advantages of the present disclosure, there is provided a fan motor that may include a stator assembly formed in a cylindrical shape extending in one direction and having a plurality of teeth therein, a vane hub formed to surround a side surface and an upper end portion of the stator assembly, and having vanes protruding from an outer circumferential surface thereof, and a through hole formed through an upper end portion thereof, a shaft coupled to the stator assembly and the through hole of the vane hub, to be rotatable relative to the stator assembly and the vane hub, and an impeller disposed on an upper side of the vane hub, and coupled to the shaft to rotate together with the shaft. Each of the teeth may extend in the one direction along an inner circumferential surface of the stator assembly and wound with a coil. The stator assembly may have heat-dissipating channels each formed in a space defined by the inner circumferential surface of the stator assembly and two adjacent teeth. The vane hub may include a heat-dissipating hole formed through an upper end portion thereof with being spaced apart from the through hole. The heat-dissipating hole may overlap one of the heat-dissipating channels in the one direction.

The heat-dissipating hole may be provided in plurality in the single vane hub, and the number of heat-dissipating holes provided in the single vane hub may be equal to the number of teeth disposed in the single stator assembly.

The number of teeth provided in the single stator assembly may be a multiple of three.

The fan motor may further include a housing surrounding side surfaces of the vane hub and the impeller. A main flow path may be defined in a space between an outer circumferential surface of the impeller and an inner circumferential surface of the housing and a space between an outer circumferential surface of the vane hub and an inner circumferential surface of the housing, and a returning flow path may be defined in the heat-dissipating channel, the heat-dissipating hole, and a space between the vane hub and the impeller. The returning flow path may join the main flow path.

A cross-sectional area of the heat-dissipating hole may be larger than or equal to a cross-sectional area of the heat-dissipating channel.

An area of an outer circumference of a space defined between the vane hub and the impeller may be larger than or equal to a sum of cross-sectional areas of the plurality of heat-dissipating holes.

A shortest distance between an outer circumference of the vane hub and an outer circumference of the heat-dissipating hole may be 1 mm or more.

A shortest distance between an outer circumference of the through hole and an outer circumference of the heat-dissipating hole may be 1 mm or more.

The fan motor may further include a bearing disposed between the shaft and the vane hub, coupled to each of the shaft and the vane hub, and formed in an annular shape.

A shortest distance between an outer circumference of the bearing and an outer circumference of the heat-dissipating hole may be 1 mm or more.

A cross-section of the heat-dissipating hole may be rounded rather than angular.

A cross-section of the heat-dissipating hole may have as a shape corresponding to a cross-section of the heat-dissipating channel.

The vane hub may be formed such that an outer edge of an upper end portion thereof is chamfered.

According to another embodiment of the present disclosure, there is provided a hair dryer that may include a body part formed in a cylindrical shape extending in one direction, having inner and outer diameters reduced from one side to another side thereof, and having a hollow portion therein, a handle part formed in a cylindrical shape extending in another direction, disposed beneath the body part, and coupled to the body part, a fan motor including a stator assembly, a vane hub, a shaft, and an impeller, and accommodated in one of the body part and the handle part, a controller configured to control an operating state of the fan motor, and a power supply unit electrically connected to the fan motor and the controller to supply electric energy to the fan motor and the controller. The stator assembly may be formed in a cylindrical shape extending in one direction and has a plurality of teeth therein. The vane hub may be formed to surround a side surface and an upper end portion of the stator assembly, and include a through hole and a heat-dissipating hole formed through the upper end portion thereof, the through hole and the heat-dissipating hole being spaced apart from each other. The shaft may be coupled to the stator assembly and the through hole of the vane hub. The impeller may be disposed on an upper side of the vane hub and coupled to the shaft. Each of the teeth may extend in the one direction along an inner circumferential surface of the stator assembly and wound with a coil. The stator assembly may have heat-dissipating channels each formed in a space defined by the inner circumferential surface of the stator assembly and two adjacent teeth. The heat-dissipating hole may overlap one of the heat-dissipating channels in the one direction.

The number of teeth provided in the single stator assembly may be a multiple of three, the heat-dissipating hole may be provided in plurality in the single vane hub, and the number of heat-dissipating holes provided in the single vane hub may be equal to the number of teeth disposed in the single stator assembly.

A cross-sectional area of the heat-dissipating hole may be larger than or equal to a cross-sectional area of the heat-dissipating channel.

An area of an outer circumference of a space defined between the vane hub and the impeller may be larger than or equal to a sum of cross-sectional areas of the plurality of heat-dissipating holes.

A cross-section of the heat-dissipating hole may be rounded rather than angular.

A cross-section of the heat-dissipating hole may have as a shape corresponding to a cross-section of the heat-dissipating channel.

The vane hub may be formed such that an outer edge of an upper end portion thereof is chamfered.

Advantageous Effects of Invention

Among various effects of the present disclosure, effects that can be obtained through the solution to problems will be described as follows.

First, a heat-dissipating channel is formed in a space defined by an inner circumferential surface of a stator and a space between two adjacent teeth. A plurality of heat-dissipating holes are formed through an upper end portion of a vane hub. At this time, the heat-dissipating hole is aligned on a straight line with the heat-dissipating channel.

Accordingly, internal heat of a fan motor in which a coil is surrounded by other structures can be dissipated through the heat-dissipating channel and the heat-dissipating hole.

In particular, in a fan motor having a three-phase motor structure in which a coil is surrounded by an insulator, internal heat of the fan motor can be more efficiently dissipated through the heat-dissipating channel and the heat-dissipating hole.

This can also prevent deterioration of motor performance due to the internal heat of the fan motor.

Also, as an impeller rotates, pressure in a space between the impeller and the vane hub becomes lower than atmospheric pressure.

Accordingly, internal heat of the fan motor moves to the space between the impeller and the vane hub through the heat-dissipating channel and the heat-dissipating hole. As a result, the internal heat of the fan motor is dissipated into the space between a housing and the vane hub.

That is, the internal heat of the fan motor can be dissipated through a returning flow of air without a separate external power source.

This can also facilitate miniaturization of the motor without requiring a separate external power source.

In addition, since the heat-dissipating hole is formed through an upper end portion of the vane hub, air passing through the impeller is prevented from directly flowing into the heat-dissipating hole. That is, air is introduced into a stator from a lower side of the fan motor through the returning flow.

This can prevent noise from being generated when air that has passed through the impeller directly flows into the heat-dissipating hole.

Furthermore, noise generated during an operation of the motor can be reduced.

Figure 2:
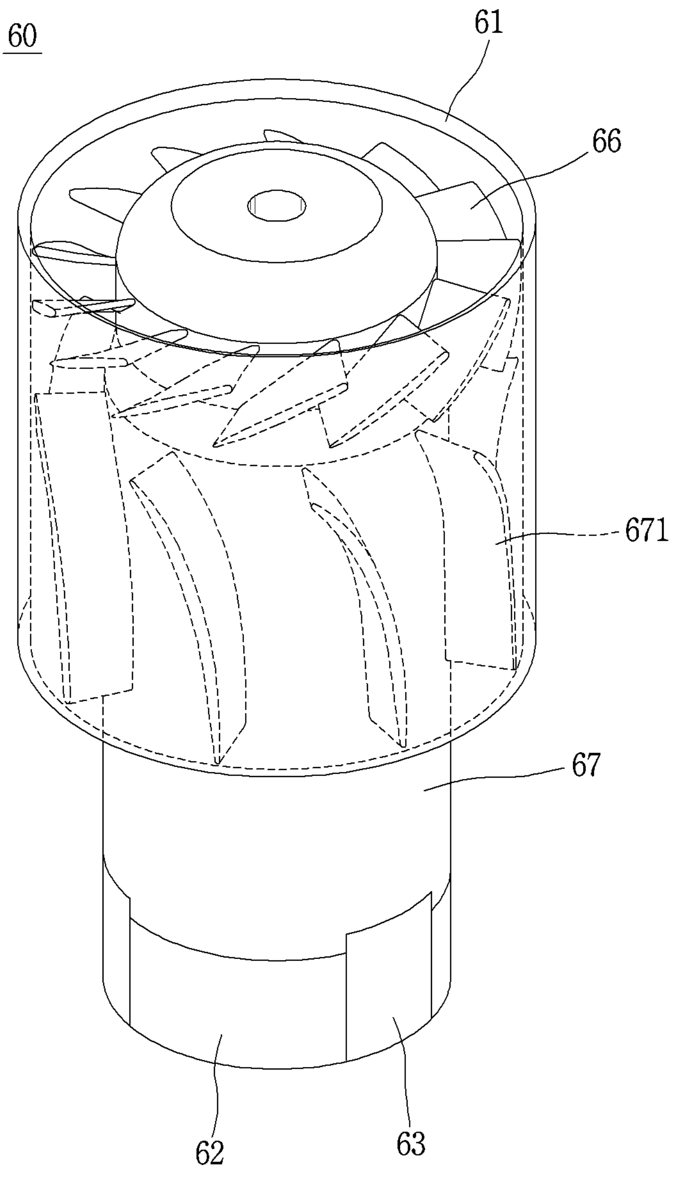
FIG. 2 is a perspective view illustrating a fan motor of FIG. 1.
Figure 8:
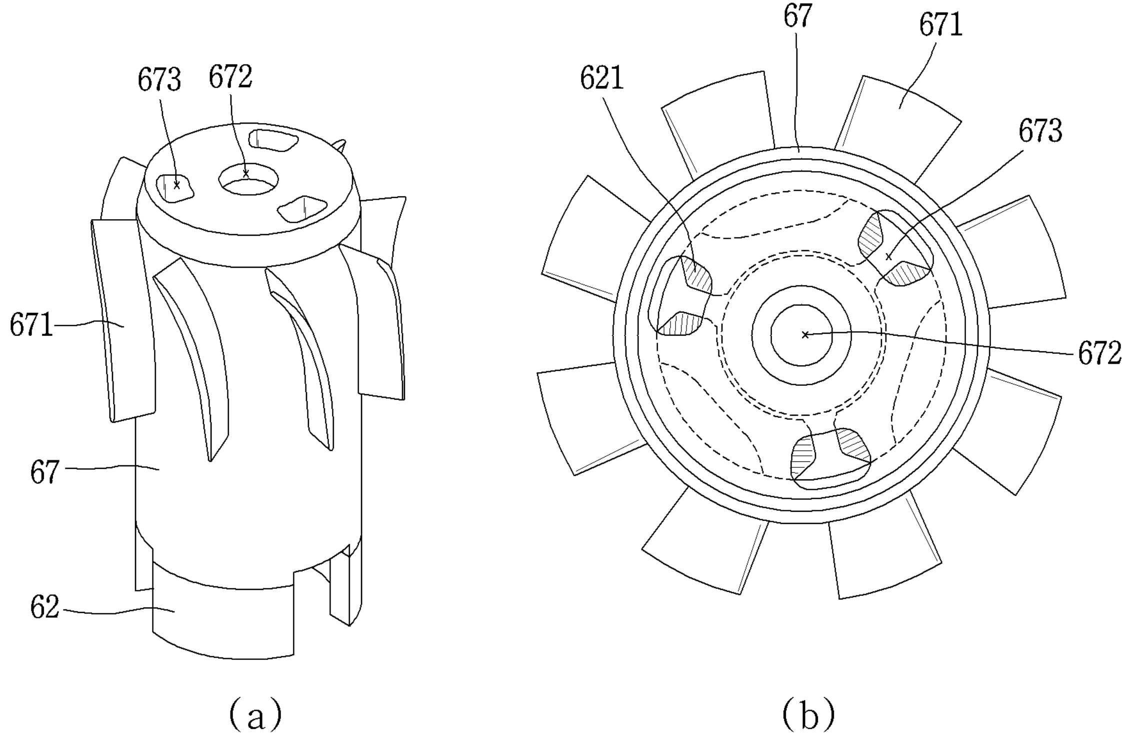

(a) of FIG. 8 is a perspective view illustrating a stator and a vane hub included in the fan motor of FIG. 2.

(b) of FIG. 8 is a planar view illustrating the stator and the vane hub included in the fan motor of FIG. 2.

Figure 9:
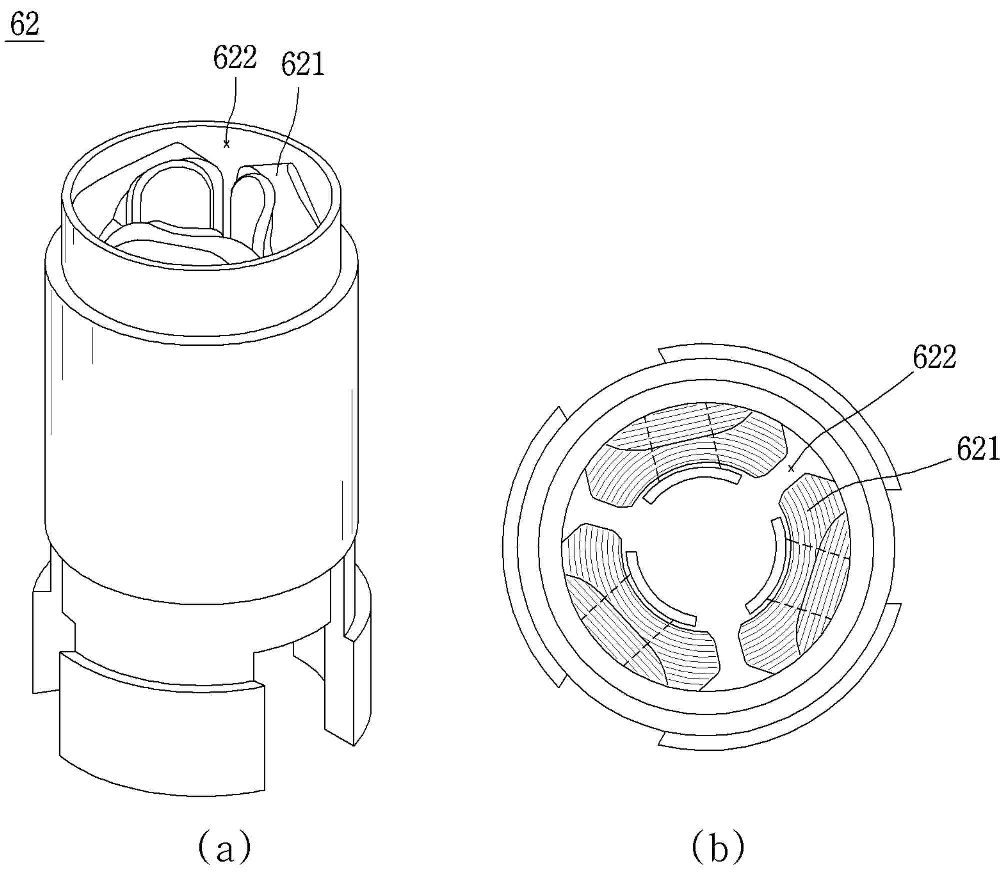

(a) of FIG. 9 is a perspective view illustrating the stator of FIG. 8.

(b) of FIG. 9 is a planar view illustrating the stator of FIG. 8.

Figure 10:
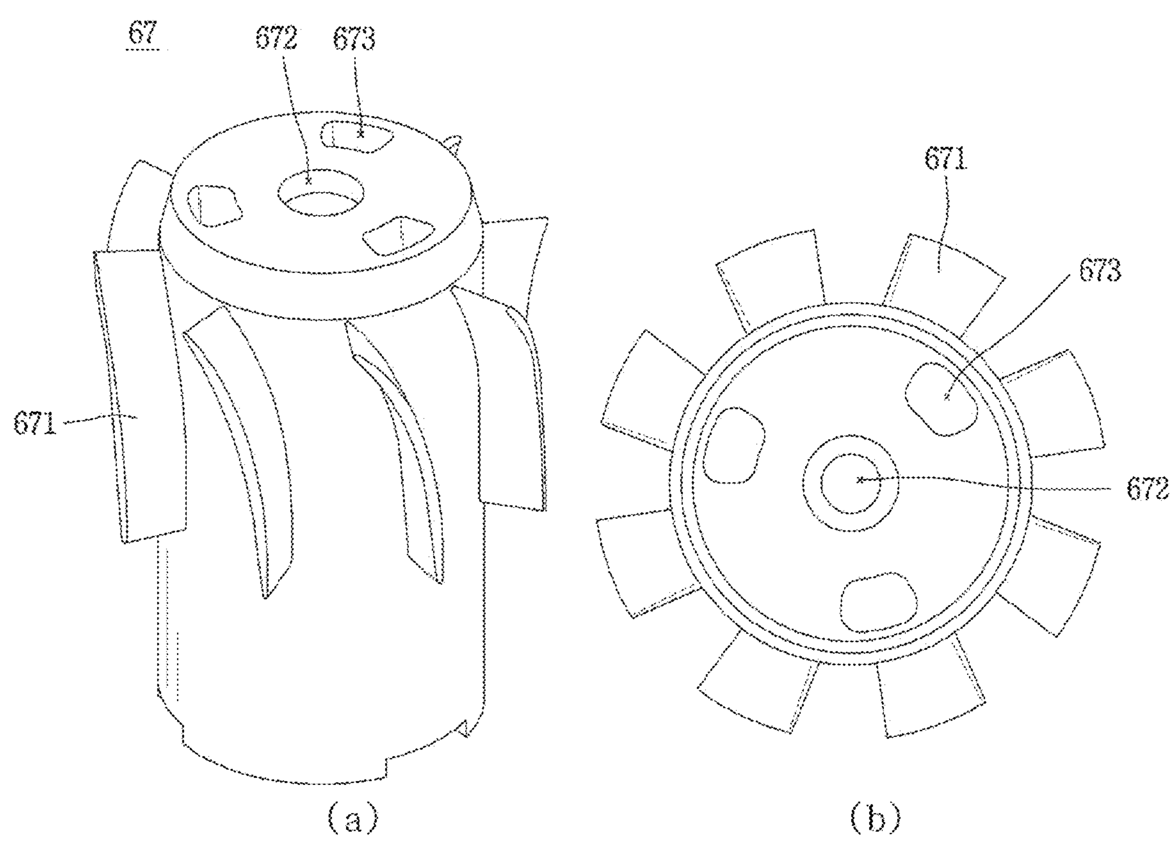

(a) of FIG. 10 is a perspective view illustrating the vane hub FIG. 8.

(b) of FIG. 10 is a planar view illustrating the vane hub of FIG. 8.

Figure 11:
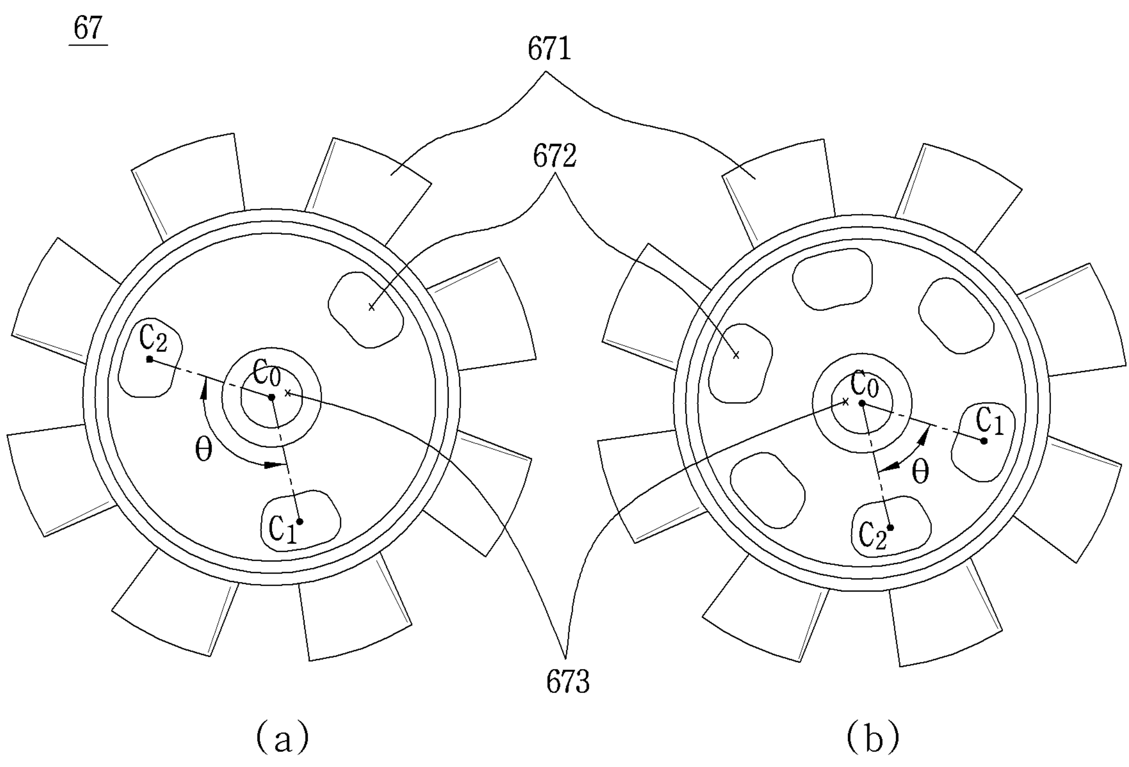

(a) of FIG. 11 is a planar view illustrating a vane hub in accordance with one embodiment of the present disclosure.

(b) of FIG. 11 is a planar view illustrating a vane hub in accordance with another embodiment of the present disclosure.

MODE FOR THE INVENTION

Hereinafter, a fan motor 60 according to an embodiment of the present disclosure and a hair dryer 1 including the fan motor 60 will be described in detail with reference to the drawings.

In the following description, in order to clarify the characteristics of the present disclosure, descriptions of some components will be omitted.

In this specification, the same/like reference numerals are given to the same/like components even in different embodiments, and a redundant description thereof will be omitted.

The accompanying drawings are merely used to help easily understand the technical idea of the present disclosure and it should be understood that the idea of the present disclosure is not limited by the accompanying drawings.

Figure 1:
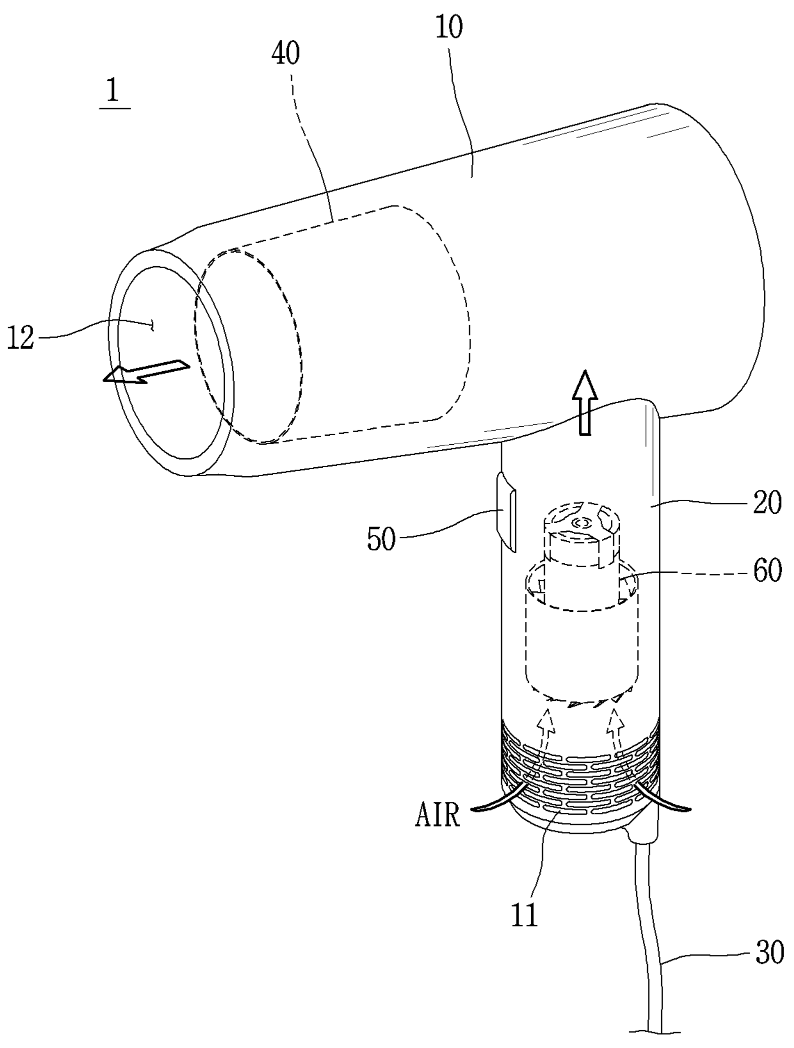
FIG. 1 is a perspective view illustrating a hair dryer in accordance with an embodiment of the present disclosure.

Hereinafter, a hair dryer 1 according to one embodiment of the present disclosure will be described with reference to FIG. 1.

The hair dryer 1 includes a body part 10, a handle part 20, a power supply unit 30, a heating unit 40, a controller 50, and a fan motor 60.

The body part 10 is formed in a cylindrical shape extending in one direction. In addition, the body part 10 has inner and outer diameters that are reduced from one side to another side.

In the illustrated embodiment, the one direction in which the body part 10 extends may be defined as a direction perpendicular to a direction that the handle part 20 extends.

The body part 10 is not limited to the illustrated shape and may be formed in various shapes.

The body part 10 has a hollow portion therein. At this time, the hollow portion communicates with an air inlet 11 and an air outlet 12. Accordingly, air suctioned through the air inlet 11 may be discharged to the air outlet 12 through the hollow portion.

The air inlet 11 suctions external air and supplies the air to the fan motor 60.

The air inlet 11 is formed through a surface of the body part 10 or the handle 20.

In the illustrated embodiment, the air inlet 11 is formed through a lower portion of a side surface of the handle part 20, to suction air from the lower portion of the side surface of the handle part 20.

In the embodiment, the air inlet 11 has a plurality of air gaps formed through the lower portion of the side surface of the handle part 20.

The air inlet 11 is not limited to the illustrated shape and may be formed in various shapes. For example, the air inlet 11 may alternatively be formed through an end portion of one side of the body part 10.

The air outlet 12 discharges the external air suctioned through the air inlet 11 to the outside again. Specifically, the air outlet 12 discharges the external air, which has suctioned through the air inlet 11 and passed through the fan motor 60, to the outside again.

The air outlet 12 is disposed in an end portion of another side of the body part 10.

In the illustrated embodiment, the air outlet 12 is formed as a hollow hole having a circular cross-section.

In addition, the air outlet 12 communicates with the hollow hole of the body part 10 and the air inlet 11.

Accordingly, the air outlet 12 can discharge the air discharged from the fan motor 60 to the outside.

The handle part 20 is coupled to a lower side of the body part 10.

The handle part 20 is a part that a user of the hair dryer 1 can grip with a hand.

The handle part 20 is disposed on a lower side of the body part 10, and an upper end portion of the handle part 20 and the body part 10 are coupled to each other.

The handle part 20 is formed in a cylindrical shape extending in a direction different from the direction that the body part 10 extends.

In the illustrated embodiment, the body part 10 extends in left and right directions, and the handle part 20 extends in a vertical (up and down) direction. The extension direction of the body part 10 and the extension direction of the handle part 20 are perpendicular to each other.

The handle part 20 is not limited to the illustrated shape and may be formed in various shapes. For example, the handle part 20 may be formed in a shape of a polygonal column.

The power supply unit 30 is coupled to a lower side of the handle part 20.

The power supply unit 30 is coupled to the lower side of the handle part to supply electric energy to the heating unit 40, the controller 50, and the fan motor 60.

To this end, the power supply unit 30 is electrically connected to the heating unit 40, the controller 50, and the fan motor 60.

In the illustrated embodiment, the power supply unit 30 is configured as a wire through which current is supplied from an external power source.

The power supply unit 30 is not limited to the illustrated shape and structure, and may be implemented in various types that can supply electric energy to the heating unit 40, the controller 50, and the fan motor 60. For example, the power supply unit 30 may be a battery.

When the power supply unit 30 supplies power to the heating unit 40, the heating unit 40 heats air discharged from the fan motor 60.

The heating unit 40 is disposed inside the body part 10. Preferably, the heating unit 40 is disposed inside the body part 10 to be adjacent to the air outlet 12. This is because heat loss of the air may occur while the air heated by the heating unit 40 flows to the air outlet 12.

The air discharged from the fan motor 60 may be heated by the heating unit 40 before being exhausted to the outside of the hair dryer 1 through the air outlet 12. Accordingly, the heated high-temperature air can be discharged to the outside through the air outlet 12.

The heating unit 40 is not limited to the illustrated shape and structure, and may be implemented in various types that can heat air. For example, the heating unit 40 may be a resistance wire that generates heat while current passes through it.

The controller 50 controls operating states of the heating unit 40 and the fan motor 60. Specifically, the controller 50 controls ON/OFF and a heating temperature of the heating unit 40, ON/OFF and a rotational speed of the fan motor 60, and the like.

In the illustrated embodiment, the controller 50 is implemented as a switch and coupled to the surface of the handle part 20.

The controller 50 is not limited to the illustrated shape and structure, and may be implemented in various types that can control the operating states of the heating unit 40 and the fan motor 60.

When the controller 50 turns on (operates) the heating unit 40, heat is generated in the heating unit 40 to increase a temperature of air passing through the heating unit 40.

At this time, the controller 50 may control a temperature of the heating unit 40 to adjust the temperature of the air passing through the heating unit 40. That is, the controller 50 can control (adjust) the temperature of the air discharged through the air outlet 12.

Also, when the controller 50 turns on the fan motor 60, the fan motor 60 moves the air suctioned from the air inlet 11 to the air outlet 12.

That is, the fan motor 60 suctions external air through the air inlet 11 and emits the air toward the air outlet 12. This corresponds to a main flow of air to be described later (see FIGS. 3 and 5).

At this time, the controller 50 may control the rotational speed of the fan motor 60 to adjust a flow rate of air that passes through the hair dryer 1. That is, the controller 50 may adjust a wind speed (flow rate) of air discharged from the hair dryer 1.

The user of the hair dryer 1 may stop the operation of (turn off) the fan motor 60 through the controller 50 when the use of the hair dryer 1 ends.

The fan motor 60 is implemented in a form in which a fan is attached to a shaft of a small motor.

The fan motor 60 is accommodated inside either the body part 10 or the handle part 20. At this time, the fan motor 60 is disposed adjacent to the air inlet 11 so that external air can be easily suctioned.

In the illustrated embodiment, the air inlet 11 is disposed on the lower portion of the side surface of the handle part 20, and the fan motor 60 is accommodated inside the handle part 20 at a position higher than the air inlet 11.

Figure 3:
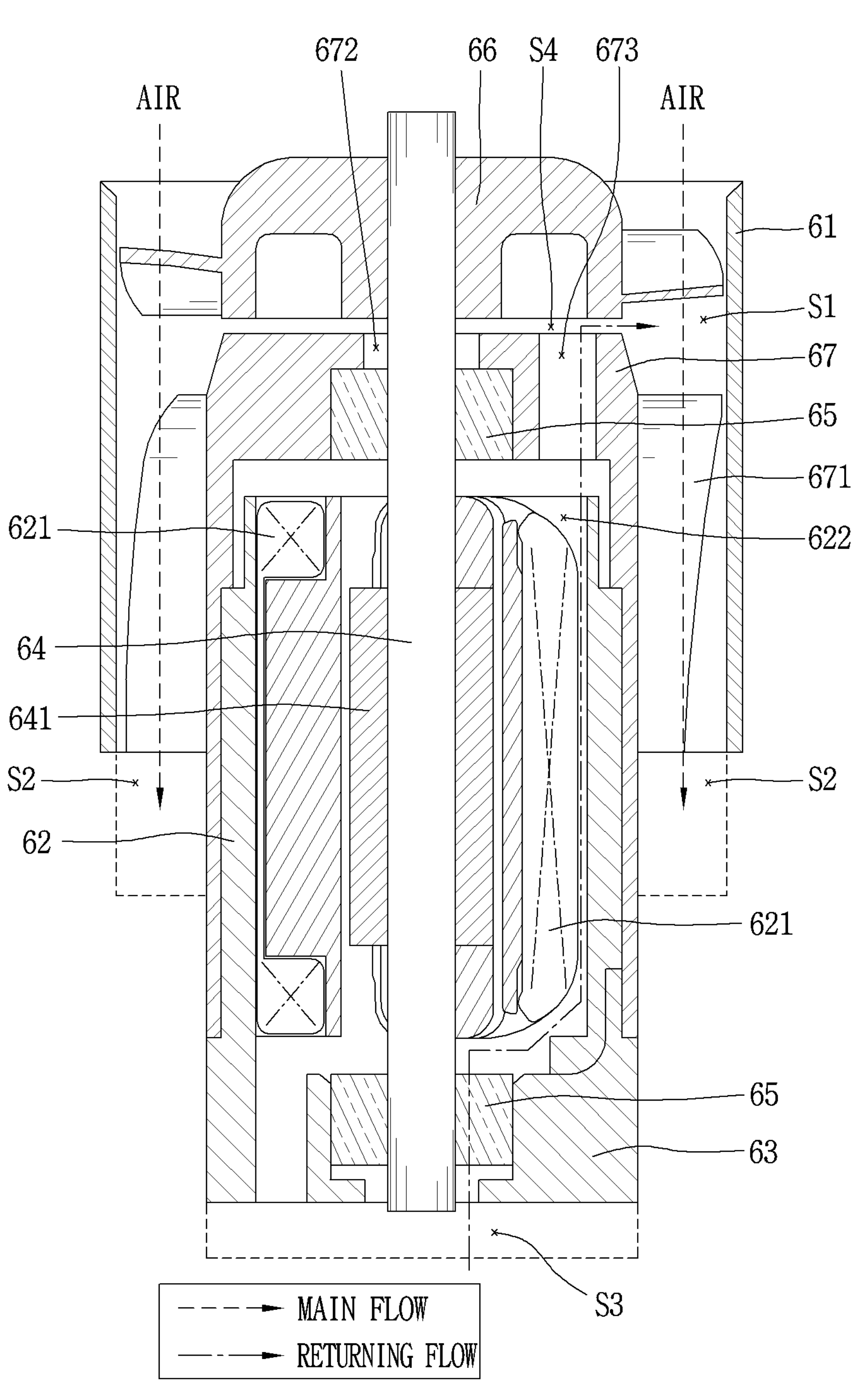
FIG. 3 is a sectional view illustrating the fan motor of FIG. 1.
Figure 4:
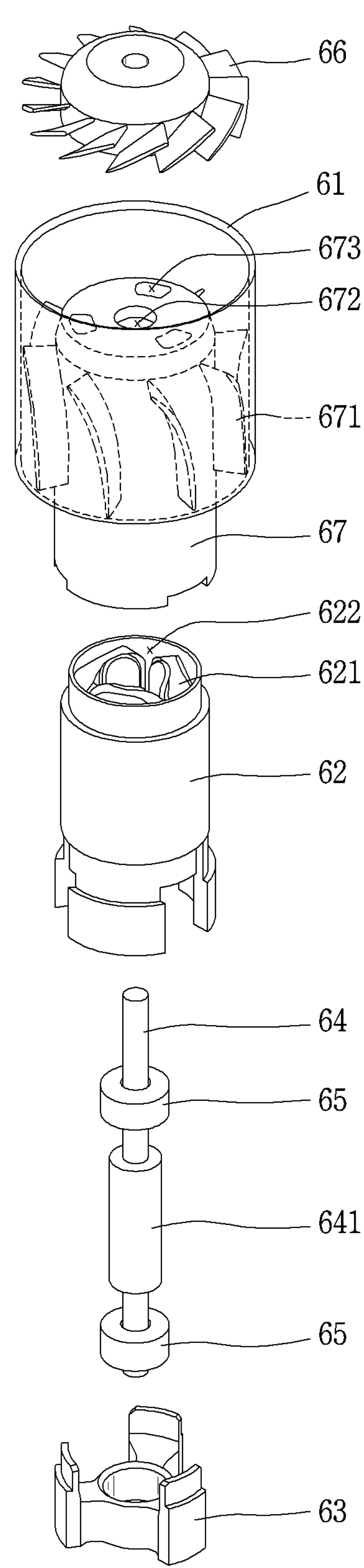
FIG. 4 is an exploded perspective view illustrating components of the fan motor of FIG. 1 in one direction.

Hereinafter, the fan motor 60 of FIG. 1 will be described in detail with reference to FIGS. 2 to 4.

The fan motor 60 includes a housing 61, a stator, a lower bracket 63, a shaft 64, a bearing 65, an impeller 66, and a vane hub 67.

The housing 61 is formed in a cylindrical shape and encloses side surfaces of the vane hub 67 and the impeller 66.

Therefore, a radius of an inner circumference of the housing 61 is larger than a distance from center to radial outer end of the impeller 66 and a distance from a center of radial outer end of the vane hub 67.

In the illustrated embodiment, the housing 61 is formed such that its inner circumferential surface is disposed adjacent to the vane hub 67.

The air suctioned into the hair dryer 1 through the air inlet 11 passes through the inside of the housing 61 and moves from top to bottom of the housing 61.

Specifically, the air suctioned through the air inlet 11 passes through a space S1 defined between the inner circumferential surface of the housing 61 and an outer circumferential surface of the vane hub 67 and moves to a lower space S2 of the housing 61.

In other words, the air suctioned through the air inlet 11 moves from the top to bottom of the housing 61. This corresponds to a main flow of air.

At this time, the vane hub 67 guides the main flow of the air through vanes 671 disposed on the outer circumferential surface thereof.

The stator is accommodated inside the housing 61 and the vane hub 67.

The stator includes a stator assembly 62 and teeth 621.

The stator assembly 62 is disposed to surround the plurality of teeth 621. A coil is wound around each of the teeth 621.

An inner circumference of the stator assembly 62 is formed as an insulator, which is an electrical insulator, so that the coil wound around the tooth 621 is not electrically connected to the outside of the stator.

Accordingly, the main flow of air cannot be directly made into the stator, and the heat generated inside the stator cannot be cooled by the main flow of air.

The lower bracket 63 is inserted into a lower end portion of the stator assembly 62.

In the illustrated embodiment, a protrusion of the lower bracket 63 is inserted into the lower end portion of the stator assembly 62. Accordingly, the lower end portion of the stator assembly 62 is formed in a shape corresponding to the protrusion of the lower bracket 63.

The stator assembly 62 fixes the teeth 621 and the like so that the teeth 621 and the like are not separated from a preset position or rotated.

The stator assembly 62 is formed in a cylindrical shape extending in one direction. That is, the one direction in which the stator assembly 62 extends may be defined as the axial direction of the stator assembly 62.

The stator assembly 62 is provided with a plurality of teeth 621 and heat-dissipating channels 622 therein.

In the illustrated embodiment, three teeth 621 are provided inside the single stator assembly 62.

However, the number of teeth 621 provided inside the stator assembly 62 is not limited to the illustrated embodiment. For example, the number of teeth 621 provided inside the stator assembly 62 may be six (see FIG. 11).

A coil is wound on each tooth 621.

The coil wound around the tooth 621 induces a rotating magnetic field to rotate the rotor, the shaft 64, and the impeller 66.

The teeth 621 are disposed adjacent to an inner circumferential surface of the stator assembly 62. At this time, the teeth 621 extend along the inner circumferential surface of the stator assembly 62 in the one direction.

The teeth 621 and coils wound on the teeth 621 are not limited to the illustrated structures and may be configured in various forms.

In the illustrated embodiment, electromotive forces having the same frequency and different phases are generated in the respective coils wound around the three teeth 621. That is, three-phase alternating current (AC) currents are generated in the coils wound around the three teeth 621.

At this time, an angle between the two adjacent teeth 621 is 120 degrees based on a central point of the stator assembly 62.

When the AC current is generated in the coil, a rotating magnetic field is created around the coil. The rotating magnetic field rotates the rotor and consequently rotates the shaft 64 and the impeller 66 coupled with the rotor.

Therefore, the coil is preferably made of an electrically conductive material.

In addition, for an efficient operation of the fan motor 60, the plurality of teeth 621 included in one stator are arranged so that the angles between the two adjacent teeth 621 are constant.

That is, the plurality of teeth 621 included in one stator are arranged so that the angles between two adjacent teeth 621 are constant.

The heat-dissipating channel 622 is formed in a space defined by the two adjacent teeth 621 and the inner circumferential surface of the stator assembly 62.

The heat-dissipating channel 622 defines a part of a flow path (or channel) for refluxing air (hereinafter, referred to as a "returning flow path").

The lower bracket 63 is coupled to the lower end portion of the stator assembly 62.

The lower bracket 63 supports the stator assembly 62, the shaft 64, and the vane hub 67 so that the stator assembly 62, the shaft 64, and the vane hub 67 do not disengage from their pre-designed positions.

An air returning flow path is defined in a space between the lower end portion of the lower bracket 63 and the lower end portion of the stator assembly 62. At this time, a returning flow of air is a flow that air is introduced from a lower space S3 of the lower bracket 63 into the heat-dissipating channel 622 through the space between the lower end portion of the lower bracket 63 and the lower end portion of the stator assembly 62.

The lower bracket 63 is not limited to the illustrated shape and may be formed in various shapes.

In the illustrated embodiment, a protrusion protrudes upward from an upper surface of the lower bracket 63.

The protrusion is inserted into the lower end portion of the stator assembly 62 and the lower end portion of the vane hub 67, to be coupled to the stator assembly 62 and the vane hub 67, respectively.

The shaft 64 is supported by the lower bracket 63 and transmits power to the impeller 66 through a rotational motion.

The shaft 64 is formed in a cylindrical shape extending in one direction.

The shaft 64 is coupled through the stator assembly 62, the lower bracket 63, the bearing 65, and the vane hub 67.

Preferably, the shaft 64 has its center line aligned on a straight line with center lines of the stator assembly 62, the lower bracket 63, the bearing 65, and the vane hub 67, and is coupled through each of the stator assembly 62, The lower bracket 63, the bearing 65, and the vane hub 67.

Also, the shaft 64 is rotatable relative to the stator assembly 62, the lower bracket 63, the bearing 65, and the vane hub 67.

The rotor is coupled to the shaft 64 to generate a rotational motion relative to the shaft 64.

The rotor includes a permanent magnet 641.

The permanent magnet 641 is formed in a cylindrical shape with a hollow portion therein. Specifically, the permanent magnet 641 has an annular cross-section extending in the same direction as the extension direction of the shaft 64.

The permanent magnet 641 is coupled to an outer circumferential surface of the shaft 64 so that its inner circumference surrounds a portion of the outer circumferential surface of the shaft 64. That is, the shaft 64 is coupled through the hollow portion of the permanent magnet 641.

Preferably, the permanent magnet 641 is coupled to the outer circumferential surface of the shaft 64 such that the center line of the permanent magnet 641 is aligned on the straight line with the center line of the shaft 64.

In addition, the rotor is disposed inside the stator so as to be surrounded by the plurality of teeth 621. Preferably, the center line of the permanent magnet 641 is aligned on the straight line with the center line of the stator assembly 62.

The permanent magnet 641 is formed of a magnetic material. Accordingly, when an AC current is generated in the coil wound around the tooth 621, a rotating magnetic field is induced on the center line of the stator assembly 62. Accordingly, the permanent magnet 641 located on the center line of the stator assembly 62 is rotated by the rotating magnetic field generated by the coil.

Specifically, when the AC current is generated in the coil, the permanent magnet 641 rotates in one of clockwise and counterclockwise directions.

Accordingly, the shaft 64 coupled to the inner circumferential surface of the permanent magnet 641 rotates in the one direction together with the permanent magnet 641, and the impeller 66 coupled to the outer circumferential surface of the shaft 64 also rotates in the one direction together with the permanent magnet 641 and the shaft 64.

That is, when the AC current is generated in the coil, the permanent magnet 641 rotates in one of clockwise and counterclockwise directions together with the shaft 64 and the impeller 66.

At this time, when the permanent magnet 641 and the shaft 64 rotate at a high rotational speed, friction occurs among the permanent magnet 641, the shaft 64, and other members disposed adjacent to the permanent magnet 641 and the shaft 64. This causes heat inside the fan motor 60 and damage to the fan motor 60.

The fan motor 60 from which a coil is exposed to outside may be cooled by external air of the fan motor 60.

However, the fan motor 60 in which the coil is surrounded by other structures is difficult to be cooled by external air of the fan motor 60. Also, heat generated inside the stator is accumulated inside the stator, which may cause the damage to the fan motor 60.

In particular, in the case of the fan motor 60 belonging to a three-phase motor, the coil of the fan motor 60 is surrounded by other structures such as an insulator and the like, so cooling of the fan motor 60 is limited.

Therefore, it is required to develop a fan motor 60 capable of dissipating internal heat of the fan motor 60 while maintaining a structure in which a coil is surrounded by other structures.

The present disclosure solves this problem through a heat-dissipating hole 673 disposed in an upper end portion of the vane hub 67. A detailed description thereof will be given later (see FIG. 5).

The bearing 65 reduces a magnitude of frictional resistance during the rotational motion of the permanent magnet 641, the shaft 64, and the impeller 66, thereby assisting the rotational motion of the permanent magnet 641, the shaft 64, and the impeller 66 and prevent the damage to the fan motor 60 due to the rotational motion.

Specifically, the bearing 65 fixes the shaft 64 at a predesigned position, supports a weight of the shaft 64 and a load applied to the shaft 64, and reduces a magnitude of frictional resistance generated during the rotational motion of the shaft 64.

The bearing 65 is formed in an annular shape and surrounds a part of the outer circumferential surface of the shaft 64.

An inner diameter of the bearing 65 is larger than or equal to an outer diameter of the shaft 64.

The bearing 65 is provided in plurality in the fan motor 60.

One of the plurality of bearings 65 is disposed between the shaft 64 and the vane hub 67 to be coupled to the shaft 64 and the vane hub 67, respectively.

Another one of the plurality of bearings 65 is disposed between the shaft 64 and the lower bracket 63 to be coupled to the shaft 64 and the lower bracket 63, respectively.

The bearings 65 are not limited to the illustrated shape and structure, and may be configured in various types capable of reducing frictional resistance generated during the rotation of the shaft 64. For example, the bearing 65 may be configured as a ball bearing.

The impeller 66 rotates along with the rotational motion of the shaft 64 to generate an air flow.

The impeller 66 is spaced upward apart from the upper end portion of the vane hub 67.

A side surface of the impeller 66 is surrounded by the housing 61.

The impeller 66 is coupled to a portion of the outer circumferential surface of the shaft 64. Therefore, the impeller 66 rotates together with the shaft 64 when the shaft 64 rotates.

In the illustrated embodiment, blades protrude from the outer circumferential surface of the impeller 66.

The blades are disposed adjacent to the inner circumferential surface of the housing 61, and extend along the outer circumferential surface of the impeller 66 to be curved in a predetermined direction.

The predetermined direction allows air of an upper side of the impeller 66 to flow to a lower side of the impeller 66 during the rotation of the impeller 66. That is, the predetermined direction guides the main flow of air.

In addition, in the illustrated embodiment, an annular recess is formed in the lower end portion of the impeller 66.

When the recess is formed in the lower end portion of the impeller 66, weights of the impeller 66 and the fan motor 60 can be further reduced. Also, performance of the fan motor 60 can be further improved.

The impeller 66 is not limited to the illustrated shape and structure, and may be formed in various shapes and structures capable of flowing air from the upper side to the lower side of the impeller 66.

As described above, when current is supplied to the fan motor 60, the shaft 64 rotates together with the permanent magnet 641. Accordingly, when the fan motor 60 receives electric energy, the impeller 66 rotates together with the shaft 64.

When the impeller 66 rotates, the main flow of air is generated such that the air flows from the upper side to the lower side of the impeller 66.

Specifically, when the impeller 66 rotates, air flows from the upper side of the impeller 66 to a space between the housing 61 and the impeller 66 and a space S1 between the housing 61 and the vane hub 67.

That is, the main flow of air passes through the space between the housing 61 and the impeller 66 and moves into the space S1 between the housing 61 and the vane hub 67.

Thus, negative pressure is formed in the space between the housing 61 and the impeller 66 and in the space S1 between the housing 61 and the vane hub 67.

The vane hub 67 guides a flow path (channel) of the main flow of air (hereinafter referred to as "main flow path (or main channel)").

The vane hub 67 is spaced downward apart from the lower end portion of the impeller 66.

In addition, the vane hub 67 surrounds the side surface and an upper end portion of the stator assembly 62.

Accordingly, the inside of the vane hub 67 is formed in a shape corresponding to the side surface and the upper end portion of the stator assembly 62.

In addition, an inner diameter of the upper end portion of the vane hub 67 is larger than or equal to an outer diameter of the upper end portion of the stator assembly 62.

In the illustrated embodiment, the vane hub 67 is chamfered at an outer edge of its upper end portion.

This can minimize flow loss that may occur when the returning flow of air to be explained later passes through a space S4 between the impeller 66 and the vane hub 67 and joins the main flow of air.

The vane hub 67 includes vanes 671, a through hole 672, and heat-dissipating holes 673.

The vanes 671 guide a flow path of air that passes through the space between the vane hub 67 and the housing 61. That is, the vanes 671 guide the main flow path of air.

The vanes 671 protrude radially outward from an outer circumferential surface of the vane hub 67.

In the illustrated embodiment, the vanes 671 are disposed adjacent to the inner circumference of the housing 61. Specifically, the radially outer end of each vane 671 is disposed adjacent to the inner circumference of the housing 61.

Also, in the above embodiment, the vane 671 extends along the outer circumferential surface of the vane hub 67 to be curved in a height direction of the vane hub 67. This can minimize flow loss of air that passes through the impeller 66 and is introduced into the space S1 between the housing 61 and the vane hub 67. That is, the flow loss of the main flow of air can be minimized.

The vanes 671 are not limited to the illustrated shape and may be configured in various shapes. For example, each of the vanes 671 may be formed in a shape in which a triangular cross-section extends along the outer circumferential surface of the vane hub 67 to be curved in the height direction of the vane hub 67.

Air passing through the space between the housing 61 and the impeller 66 is introduced into the space between the housing 61 and the vane hub 67. Thereafter, the air introduced into the space between the housing 61 and the vane hub 67 flows from the upper side to the lower side of the vane hub 67 along the vanes 671, and finally flows into the lower space S2 of the housing 61.

That is, the main flow path of the air is defined such that the air sequentially passes through the upper portion of the impeller 66, the space between the housing 61 and the impeller 66, and the space S1 between the housing 61 and the vane hub 67 and then flows to the lower space S2 of the housing 61.

As mentioned above, the main flow of air is created, in response to the rotation of the shaft 64 coupled to the impeller 66.

A through hole 672 is formed through the upper end portion of the vane hub 67 so that the shaft 64 can rotate relative to the vane hub 67.

The shaft 64 is coupled through the through hole 672.

The through hole 672 supports the shaft 64 by guiding coupling position and direction of the shaft 64 and the vane hub 67.

The heat-dissipating hole 673 serves as a dissipating channel through which internal heat of the fan motor 60 generated during the rotation of the permanent magnet 641 and the impeller 66 is dissipated.

The heat-dissipating hole 673 is formed through the upper end portion of the vane hub 67. At this time, the heat-dissipating hole 673 is spaced apart from the through hole 672.

The heat-dissipating hole 673 overlaps one of the heat-dissipating channels 622 in the one direction of the stator assembly 62. That is, the heat-dissipating hole 673 is disposed to overlap one of the heat-dissipating channels 622 in the axial direction of the stator assembly 62. In other words, when viewed from the top or bottom of the stator assembly 62, the heat-dissipating hole 673 overlaps one of the heat-dissipating channels 622. Preferably, the heat-dissipation hole 673 and one of the heat-dissipating channels 622 are disposed on a straight line.

The heat-dissipating hole 673 may be provided in plurality in one vane hub 67. At this time, the number of heat-dissipating holes 673 provided in the single vane hub 67 corresponds to the number of teeth 621 provided on one stator.

The sum of cross-sectional areas of the plurality of heat-dissipating holes 673 provided in the single vane hub 67 is larger than or equal to an area of an outer circumference of the space defined between the impeller 66 and the vane hub 67.

Preferably, the sum of the cross-sectional areas of the plurality of heat-dissipating holes 673 provided in the single vane hub 67 is equal to the area of the outer circumference of the space defined between the impeller 66 and the vane hub 67.

That is, the sum of the flow cross-sectional areas of air passing through the heat-dissipating holes 673 is larger than or equal to a flow cross-sectional area of air passing through the space between the impeller 66 and the vane hub 67.

This can more reduce resistance applied to air that passes through an end surface of the upper end portion of the heat-dissipating hole 673. Accordingly, flow loss that is caused by the returning flow of air that passes through the space S1 defined between the impeller 66 and the vane hub 67 can be minimized. As a result, the internal heat of the fan motor 60 can be effectively dissipated.

Figure 5:
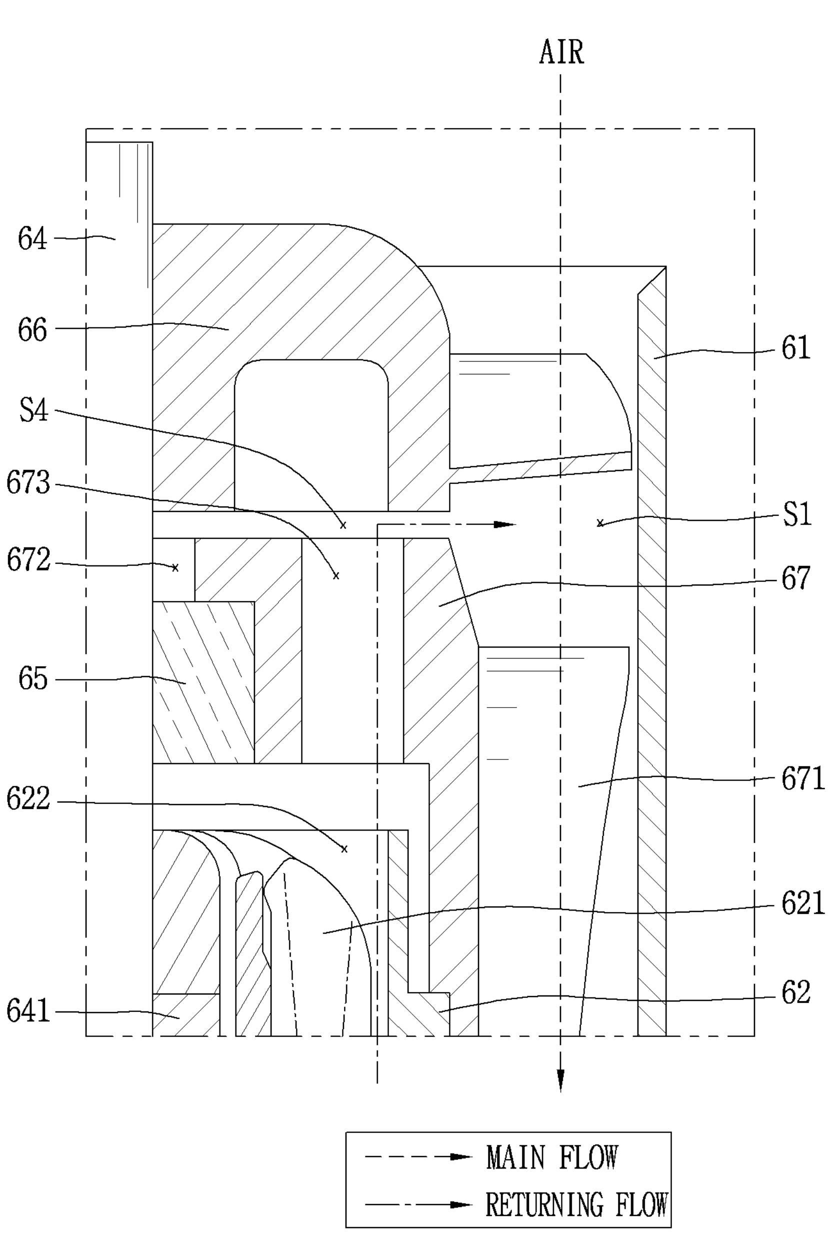
FIG. 5 is an enlarged sectional view illustrating a part of the fan motor of FIG. 1.

Hereinafter, the main flow and the returning flow of air in FIG. 3 will be described in more detail, with reference to FIG. 5.

The main flow of air is generated in the space between the housing 61 and the impeller 66 and the space S1 between the housing 61 and the vane hub 67.

As described above, the housing 61 is formed to surround the side surfaces of the impeller 66 and the vane hub 67. Thus, hollow spaces are formed between the outer circumferential surface of the impeller 66 and the inner circumferential surface of the housing 61 and between the outer circumferential surface of the vane hub 67 and the inner circumferential surface of the housing 61, respectively.

The main flow of air is created as the impeller 66 rotates.

When a rotating magnetic field is induced in the permanent magnet 641 by the coil, the shaft 64 and the impeller 66 rotate together with the permanent magnet 641. As the impeller 66 rotates, air above the impeller 66 flows into the space between the outer circumferential surface of the impeller 66 and the inner circumferential surface of the housing 61.

In the illustrated embodiment, the plurality of blades are disposed on the outer circumferential surface of the impeller 66, to guide the air above the impeller 66 to the lower side of the impeller 66 during the rotation of the impeller 66. That is, the blades guide the main flow of air.

The air introduced into the space between the outer circumferential surface of the impeller 66 and the inner circumferential surface of the housing 61 receives pressure from the upper side to the lower side so as to flow into the space S1 between the outer circumferential surface of the vane hub 67 and the inner circumferential surface of the housing 61.

Thereafter, the air introduced into the space S1 between the outer circumferential surface of the vane hub 67 and the inner circumferential surface of the housing 61 flows toward the lower space S2 of the housing 61 along the vanes 671.

In one embodiment, the vane 671 is disposed adjacent to the inner circumferential surface of the housing 61. Specifically, a radially outer end of each vane 671 is disposed adjacent to the inner circumferential surface of the housing 61.

In another embodiment, the vane 671 extends in the same direction as the direction in which air flows into the space S1 between the outer circumferential surface of the vane hub 67 and the inner circumferential surface of the housing 61.

Air reaching the lower end portion of the housing 61 is finally discharged through between the lower end portion of the housing 61 and the lower end portion of the vane hub 67.

In summary, the main flow path of the air is defined such that air sequentially passes through the upper portion of the impeller 66, the space between the housing 61 and the impeller 66, and the space S1 between the housing 61 and the vane hub 67 and then is discharged to the lower space S2 of the housing 61.

However, the internal heat of the fan motor 60 having the structure in which the coil is surrounded by other structures cannot be sufficiently discharged with only this main flow.

In the fan motor 60 having the structure in which the coil is surrounded by other structures, the coil is not exposed to the outside of the fan motor 60. In particular, in the case of the fan motor belonging to the three-phase motor, the coil is surrounded by an insulator and is not exposed to the outside of the stator assembly 62.

Therefore, in this type of fan motor 60, the main flow of air does not directly go into the stator, and has a difficulty in dissipating internal heat of the fan motor 60 through the main flow of air.

In order to solve this problem, the present disclosure uses a returning flow of air.

A returning flow path of air is defined by the heat-dissipating channel 622, the heat-dissipating hole 673, and a space S4 between the vane hub 67 and the impeller 66.

In order for the returning flow of air to occur, the main flow of air must be produced first.

In the space between the housing 61 and the impeller 66 and the space S1 between the housing 61 and the vane hub 67, dynamic pressure corresponding to an air flow increases as the main flow of air is generated.

According to Bernoulli's principle, when dynamic pressure increases at a specific point, static pressure acting in a direction perpendicular to an air flow is reduced by the increase in the dynamic pressure at the specific point.

Therefore, dynamic pressure is reduced by the main flow of air in the space between the housing 61 and the impeller 66 and the space S1 between the housing 61 and the vane hub 67.

As described above, the impeller 66 and the vane hub 67 are spaced apart from each other. Thus, a hollow space is defined between the impeller 66 and the vane hub 67.

The space S4 between the impeller 66 and the vane hub 67 communicates with the space between the housing 61 and the impeller 66 and the space S1 between the housing 61 and the vane hub 67, so as to form pressure that is lower than atmospheric pressure and higher than pressure in the space between the housing 61 and the impeller 66 and the space S1 between the housing 61 and the vane hub 67.

That is, pressure gradually decreases in the order of the lower space S3 of the stator assembly 62 and the lower bracket 63 communicating with the outside of the fan motor 60, the space S4 between the impeller 66 and the vane hub 67, and the space S1 between the housing 61 and the impeller 66 or between the housing 61 and the vane hub 67.

In contrast, the lower space S3 of the stator assembly 62 and the lower bracket 63 has the same pressure as atmospheric pressure.

Therefore, air flows from the lower space S3 of the stator assembly 62 and the lower bracket 63 where the pressure is relatively high to the space S4 between the impeller 66 and the vane hub 67 where the pressure is relatively low, due to a pressure difference.

At this time, the air sequentially passes through the heat-dissipating channel 622 and the heat-dissipating hole 673 so as to flow into the space S4 between the impeller 66 and the vane hub 67.

Specifically, the air in the lower space S3 of the stator assembly 62 and the lower bracket 63 is introduced into the space between the lower end portion of the stator assembly 62 and the lower end portion of the lower bracket 63.

At this time, the air in the lower space S3 of the stator assembly 62 and the lower bracket 63 is introduced between the protrusions of the lower bracket 63, and thereafter rotates clockwise or counterclockwise by about 60 degrees so as to be introduced into the lower end portion of the stator assembly 62. A detailed description thereof will be given later (see FIG. 6).

Thereafter, the air flows upward along the heat-dissipating channel 622 and the heat-dissipating hole 673 so as to reach the space S4 between the impeller 66 and the vane hub 67.

The heat-dissipating channel 622 is defined in the space that is defined by the inner circumferential surface of the stator assembly 62 and the two adjacent teeth 621. Accordingly, the heat-dissipating channel 622 extends in the one direction of the stator assembly 62.

The heat-dissipating hole 673 is formed through the upper end portion of the vane hub 67 so as to overlap one of the heat-dissipating channels 622 in the one direction. Preferably, the heat-dissipating hole 673 is aligned on a straight line with the heat-dissipating channel 622.

Accordingly, an air flow path between the heat-dissipating channel 622 and the heat-dissipating hole 673 can be defined in a straight line, and air flow loss can be minimized.

In one embodiment, a shortest distance between the outer circumference of the heat-dissipating hole 673 and an outer circumference of a penetration hole, between the outer circumference of the heat-dissipating hole 673 and the outer circumference of the vane hub 67, and between the outer circumference of the heat-dissipating hole 673 and the outer circumference of the through hole 672 is 1 mm or more.

Therefore, in the embodiment, the shape of the heat-dissipating hole 673 should be designed in consideration of this.

Accordingly, the cross-sectional shape of the heat-dissipating channel 622 and the cross-sectional shape of the heat-dissipating hole 673 may not correspond to each other. In this case, when the returning flow of air passes through a boundary between the heat-dissipating channel 622 and the heat-dissipating hole 673, the air may collide with the upper end portion of the vane hub 67.

However, since the returning flow of air is made by a pressure difference, a great flow loss that occurs when the air collides with the upper end portion of the vane hub 67 does not occur.

Air that has passed through the heat-dissipating hole 673 is introduced into the space S4 between the impeller 66 and the vane hub 67.

Pressure in the space S4 between the impeller 66 and the vane hub 67 is higher than pressure in the space between the housing 61 and the impeller 66 and the space S1 between the housing 61 and the vane hub 67.

Therefore, the air introduced into the space S4 between the impeller 66 and the vane hub 67 flows into the space between the housing 61 and the impeller 66 and the space S1 between the housing 61 and the vane hub 67.

That is, the air that has reached the space S4 between the impeller 66 and the vane hub 67 joins the main flow of air.

In the embodiment, the air introduced into the space S4 between the impeller 66 and the vane hub 67 is then introduced into the recess formed in the lower end portion of the impeller 66 and flows into the space between the housing 61 and the impeller 66 and the space S1 between the housing 61 and the vane hub 67. Accordingly, the air can be more smoothly introduced into the space between the housing 61 and the impeller 66 and the space S1 between the housing 61 and the vane hub 67.

In one embodiment, the vane hub 67 is chamfered at an outer edge of its upper end portion. The embodiment is advantageous in terms of preventing flow loss that may occur when the outer diameter of the vane hub 67 is larger than the outer diameter of the impeller 66.

Specifically, if the outer diameter of the vane hub 67 is larger than the outer diameter of the impeller 66, the flow loss may occur when the returning flow of air joins the main flow of air after passing through the space S4 between the impeller 66 and the vane hub 67. At this time, by chamfering the outer edge of the upper end portion of the vane hub 67, the flow loss can be minimized when the returning flow of air joins the main flow of air after passing through the space S4 between the impeller 66 and the vane hub 67.

In summary, the returning flow path of the air first sequentially passes through the lower space S3 of the stator assembly 62 and the lower bracket 63, the space between the lower end portion of the stator assembly 62 and the lower end portion of the lower bracket 63, the heat-dissipating channel 622, the heat-dissipating hole 673, and the space S4 between the impeller 66 and the vane hub 67, joins the main flow path of the air, and then is directed to the outside of the fan motor 60.

Accordingly, internal heat of the fan motor 60 can be dissipated to the outside of the fan motor 60 through the returning flow, so that the inside of the fan motor 60 can be cooled.

Furthermore, air can be introduced into the fan motor 60 by the returning flow without a separate power source. This can simplify the structure of the fan motor 60, facilitate miniaturization of the fan motor 60, and reduce a manufacturing process of the fan motor 60. Also, efficiency and performance of the fan motor 60 can be enhanced.

In the present disclosure, since the heat-dissipating hole 673 is disposed in the upper end portion of the vane hub 67, a part of the main flow of air is not directly made into the stator.

When the heat-dissipating hole 673 is formed through the side surface of the vane hub 67, a part of the main flow of air may be directly introduced into the stator. Thus, a turbulent air flow may increase, and this may cause additional noise.

Conversely, in the present disclosure, the heat-dissipating hole 673 is disposed in the upper end portion of the vane hub 67, and internal heat of the fan motor 60 is dissipated by the returning flow of air. This can prevent the additional noise due to the turbulent air flow.

Figure 6:
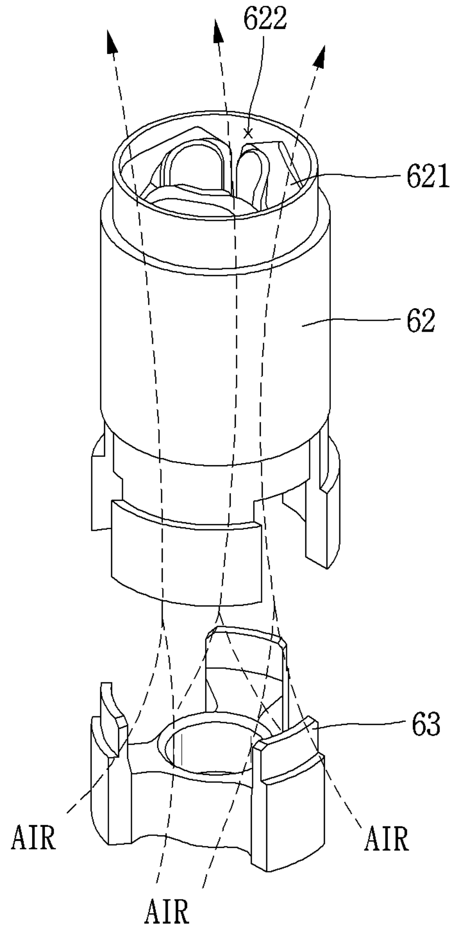
FIG. 6 is a perspective view illustrating a coupling relationship between a stator and a lower bracket included in the fan motor of FIG. 2 and a returning flow path.
Figure 7:
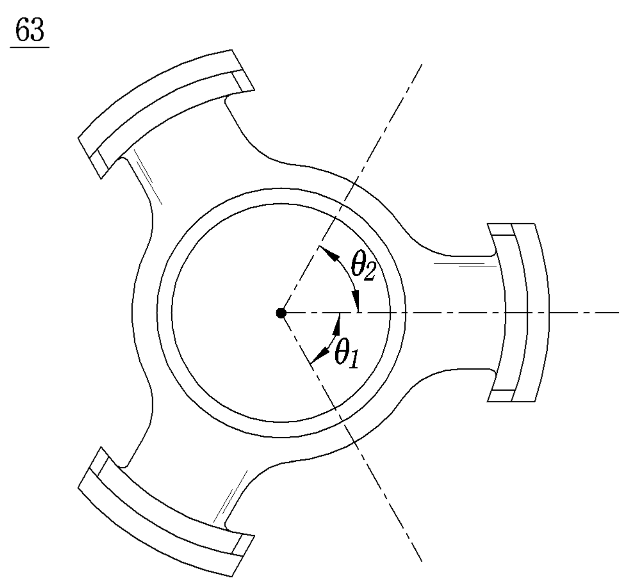
FIG. 7 is a planar view illustrating the lower bracket of FIG. 6.

Hereinafter, a coupling relationship between the stator assembly 62 and the lower bracket 63 of FIG. 2 will be described in detail with reference to FIGS. 6 and 7.

As described above, the lower bracket 63 is inserted into the lower end portion of the stator assembly 62.

In the illustrated embodiment, protrusions of the lower bracket 63 are inserted into the lower end portion of the stator assembly 62. Accordingly, recesses are formed in the lower end portion of the stator assembly 62 to have a shape corresponding to the protrusions of the lower bracket 63.

Also, in the embodiment, the recess of the stator assembly 62 and the protrusion of the lower bracket 63 are located on a straight line.

At this time, the returning flow of air passes through between two adjacent protrusions of the lower bracket 63, rotates clockwise or counterclockwise by a predetermined angle $\theta 1$, $\theta 2$, and moves into one of the recesses of the stator assembly 62.

In one embodiment, the predetermined angle $\theta 1$, $\theta 2$ is 60 degrees.

Accordingly, when air is introduced into the heat-dissipating channel 622 from the lower space S3 of the stator assembly 62 and the lower bracket 63, the air rotates to be more smoothly introduced.

Hereinafter, the structures of the stator assembly 62 and the lower bracket 67 of FIG. 2 will be described in detail with reference to FIGS. 8 to 11.

As described above, the stator assembly 62 is formed in the cylindrical shape extending in the one direction, and includes the teeth 621 and the heat-dissipating channels 622 therein.

In addition, the side surface and the upper end portion of the stator assembly 62 are enclosed by the vane hub 67. Accordingly, the side surface and the upper end portion of the stator assembly 62 are formed to correspond to the inner circumferential surface and the upper end portion of the vane hub 67, respectively.

A hollow space through which the shaft 64 can be coupled is defined in the center portion of the stator assembly 62.

The lower end portion of the stator assembly 62 is formed to engage with the protrusions of the lower bracket 63.

One stator is provided with a plurality of teeth 621.

In one embodiment, the number of teeth 621 is a multiple of three. In particular, when the fan motor 60 is a three-phase motor, the number of teeth 621 is three.

The teeth 621 are accommodated inside the stator assembly 62 to be adjacent to the inner circumferential surface of the stator assembly 62, and extend in the one direction of the stator assembly 62 along the inner circumferential surface of the stator assembly 62.

Also, a coil is wound around each tooth 621.

The teeth 621 and the coils wound on the teeth 621 are not limited to the illustrated forms and may be configured in various forms.

However, since the hollow space through which the shaft 64 is coupled should be provided in the center portion of the stator assembly 62, the shape of the teeth 621 should be designed in consideration of this point.

The heat-dissipating channel 622 is defined in the space that is defined by the inner circumferential surface of the stator assembly 62 and the two adjacent teeth 621. Accordingly, the heat-dissipating channel 622 extends in the one direction of the stator assembly 62.

The heat-dissipating channels 622 communicates with the space between the lower end portion of the stator assembly 62 and the lower end portion of the lower bracket 63. In addition, the heat-dissipating channel 622 communicates with the heat-dissipating hole 673 and the space between the impeller 66 and the vane hub 67.

Thus, the heat-dissipating channel 622 defines a part of the air returning flow path. That is, the returning flow of air is produced from the lower side to the upper side of the stator assembly 62 along the heat-dissipating channel 622 extending in the one direction of the stator assembly 62.

Accordingly, the internal heat of the fan motor 60 is dissipated to the outside of the fan motor 60 by the returning flow of air passing through the heat-dissipating channel 622. As a result, the inside of the fan motor 60 can cooled down to a low temperature.

The air passing through the heat-dissipating channel 622 is discharged to the outside through the heat-dissipating hole 673 of the vane hub 67.

The vane hub 67 surrounds the side surface and the upper end portion of the stator assembly 62. That is, the stator assembly 62 is inserted into the vane hub 67.

Accordingly, the inner circumferential surface and the upper end portion of the vane hub 67 are formed in shapes to correspond to the side surface and the upper end portion of the stator assembly 62.

In the illustrated embodiment, the vane hub 67 is chamfered at an outer edge of its upper end portion.

Therefore, the flow loss that occurs when the air returning flow path joins the main flow path can be further reduced.

In an embodiment not illustrated, the outer edge of the upper end portion of the vane hub 67 may be chamfered to be rounded.

Also in the embodiment, the flow loss that occurs when the air returning flow path joins the main flow path can be further reduced.

The vane hub 67 includes vanes 671, a through hole 672, and heat-dissipating holes 673.

The vanes 671 protrude radially outward from the outer circumferential surface of the vane hub 67.

In the illustrated embodiment, each of the vanes 671 may extend along the outer circumferential surface of the vane hub 67 to be curved in the height direction of the vane hub 67, and thus guide the main flow path of air.

The through hole 672 is formed through the upper end portion of the vane hub 67. Preferably, the through hole 672 is formed through the upper end portion of the vane hub 67 so as to overlap a center point of the upper end portion of the vane hub 67.

In addition, since the shaft 64 is coupled through the through hole 672, the inner diameter of the through hole 672 must be larger than or equal to the outer diameter of the shaft 64.

In the illustrated embodiment, the through hole 672 is formed in a shape in which a circular cross-section extends in one direction.

The heat-dissipating hole 673 is formed through the upper end portion of the vane hub 67 and is spaced apart from the through hole 672.

The heat-dissipating hole 673 overlaps one of the heat-dissipating channels 622 in the one direction of the stator assembly 62. That is, when viewed from the top or bottom of the stator assembly 62, the heat-dissipating hole 673 overlaps one of the heat-dissipating channels 622. Preferably, the heat-dissipating hole 673 is aligned on a straight line with the heat-dissipating channel 622.

The shape of the heat-dissipating hole 673 is not limited to the illustrated shape and may be formed in various shapes.

In one embodiment, the cross-section of the heat-dissipating hole 673 is round rather than angular. For example, the cross-section of the heat-dissipating hole 673 may be circular.

Accordingly, the flow loss of the returning flow of air passing through the heat-dissipating hole 673 can be further reduced.

In another embodiment, the cross-section of the heat-dissipating hole 673 has a shape corresponding to that of the heat-dissipating channel 622.

Also in the embodiment, the flow loss of the returning flow of air passing through the heat-dissipating hole 673 can be further reduced.

The related art vane hub 67 is formed to surround the side surface and the upper end portion of the stator assembly 62, and the heat-dissipating hole 673 is not formed in the upper end portion of the stator assembly 62.

Or, in the related art vane hub 67, the heat-dissipating hole 673 is formed through the side surface of the vane hub 67.

On the other hand, in the present disclosure, the heat-dissipating hole 673 is disposed in the upper end portion of the vane hub 67, and internal heat of the fan motor 60 is dissipated by the returning flow of air. This can prevent additional noise due to a turbulent air flow.

The cross-sectional area of the heat-dissipating hole 673 is larger than or equal to a cross-sectional area of the space that is defined by the inner circumferential surface of the stator assembly 62 and two adjacent teeth 621.

In other words, the cross-sectional area of the heat-dissipating hole 673 is larger than or equal to that of the heat-dissipating channel 622. Preferably, the cross-sectional area of the heat-dissipating hole 673 is equal to that of the heat-dissipating channel 622.

That is, a cross-sectional flow area of air passing through the heat-dissipating hole 673 is larger than or equal to a cross-sectional flow area of air passing through the heat-dissipating channel 622.

This can more reduce resistance applied to air that passes through a boundary between the heat-dissipating hole 673 and the heat-dissipating channel 622. This can also minimize the flow loss of the returning flow of air. As a result, the internal heat of the fan motor 60 can be dissipated more effectively.

A shortest distance between the outer circumference of the heat-dissipating hole 673 and an outer circumference of a penetration hole is 1 mm or more.

When the distance between the outer circumference of the heat-dissipating hole 673 and the outer circumference of the penetration hole is less than 1 mm, the fan motor 60 is disadvantageous in terms of durability.

Similarly, shortest distances between the outer circumference of the heat-dissipating hole 673 and the outer circumference of the vane hub 67 and between the outer circumference of the heat-dissipating hole 673 and the outer circumference of the through hole 672 are also 1 mm or more, respectively.

Therefore, the cross-sectional area of the heat-dissipating hole 673 should be designed in consideration of the shortest distances between the outer circumference of the heat-dissipating hole 673 and the outer circumference of the through hole, between the outer circumference of the heat-dissipating hole 673 and the outer circumference of the vane hub 67, and between the outer circumference of the heat-dissipating hole 673 and the through hole 672.

Due to this, when air passes through the boundary between the heat-dissipating channel and the heat-dissipating hole 673, it may collide with the upper end portion of the vane hub 67. However, since the returning flow of air is made due to a pressure difference, a great flow loss does not occur due to this.

The heat-dissipating hole 673 may be provided in plurality in the vane hub 67.

Two adjacent heat-dissipating holes 673 form a predetermined angle, on the basis of a central point of the upper end portion of the vane hub 67.

Any two adjacent heat-dissipating holes 673 among the plurality of-dissipating holes 673 constantly form the predetermined angle. That is, the predetermined angle is a value obtained by dividing 360 degrees by the number of heat-dissipating holes 673 provided in the single vane hub 67.

For example, when three heat-dissipating holes 673 are provided in the single vane hub 67, the predetermined angle is 120 degrees.

Also, the sum of cross-sectional areas of the plurality of heat-dissipating holes 673 provided in the single vane hub 67 is larger than or equal to an area of an outer circumference of the space defined between the impeller 66 and the vane hub 67.

Preferably, the sum of the cross-sectional areas of the plurality of heat-dissipating holes 673 provided in the single vane hub 67 is equal to the area of the outer circumference of the space defined between the impeller 66 and the vane hub 67.

At this time, the number of heat-dissipating holes 673 provided in the single vane hub 67 may be equal to the number of teeth 621 provided on one stator.

In one embodiment, the number of heat-dissipating holes 673 provided in the single vane hub 67 is a multiple of three. For example, the number of heat-dissipating holes 673 provided in the single vane hub 67 is three or six.

In particular, in the case of a three-phase motor, three teeth 621 are provided in one stator. Accordingly, the number of heat-dissipating holes 673 provided in the single vane hub 67 is also three.

Hereinafter, the number of heat-dissipating holes 673 provided in the vane hub 67 and the angle between two adjacent heat-dissipating holes 673 will be described in more detail, with reference to FIG. 11.

In the illustrated embodiment, the heat-dissipating hole 673 is provided in plurality in the single vane hub 67.

As described above, the heat-dissipating hole 673 is disposed to overlap one of the heat-dissipating channels 622 along the one direction of the stator assembly 62, and the heat-dissipating channel 622 is disposed in the space defined by two adjacent teeth 621 and the inner circumferential surface of the stator assembly 62.

A coil is wound on each tooth 621. In addition, the coil wound around the tooth 621 induces a rotating magnetic field in the permanent magnet 641 to rotate the permanent magnet 641.

Therefore, for an efficient operation of the fan motor 60, the plurality of teeth 621 included in one stator are arranged so that the angles between two adjacent teeth 621 are constant.

Therefore, the heat-dissipating hole 673 should also be arranged so that the angles between two adjacent heat-dissipating holes 673 are constant.

Any two adjacent heat-dissipating holes 673 are disposed to form a predetermined angle θ, based on a center of gravity C0 of the upper end portion of the vane hub 67.

Specifically, a center of gravity C1 of the cross-section of the upper end portion of any one of the plurality of heat-dissipating holes 673 and a center of gravity C2 of the cross-section of the upper end portion of another heat-dissipating hole 673 adjacent to the one heat-dissipating hole 673 form a predetermined angle θ therebetween, based on the center of gravity C0 of the upper end portion of the vane hub 67.

The predetermined angle θ is a value obtained by dividing 360 degrees by the number of heat-dissipating holes 673 provided in the single vane hub 67.

In the embodiment illustrated in (a) of FIG. 11, the number of heat-dissipating holes 673 provided in the single vane hub 67 is three.

In the embodiment, the angle between any two adjacent heat-dissipating holes 673 is constantly 120 degrees, based on the center of gravity C0 of the upper end portion of the vane hub 67.

Specifically, the center of gravity C1 of the cross-section of the upper end portion of any one of the plurality of heat-dissipating holes 673 and the center of gravity C2 of the cross-section of the upper end portion of another heat-dissipating hole 673 adjacent to the one heat-dissipating hole 673 form 120 degrees therebetween, based on the center of gravity C0 of the upper end portion of the vane hub 67.

In the embodiment illustrated in (b) of FIG. 11, the number of heat-dissipating holes 673 provided in the single vane hub 67 is six.

In the embodiment, the angle between any two adjacent heat-dissipating holes 673 is constantly 60 degrees, based on the center of gravity C0 of the upper end portion of the vane hub 67.

Specifically, the center of gravity C1 of the cross-section of the upper end portion of any one of the plurality of heat-dissipating holes 673 and the center of gravity C2 of the cross-section of the upper end portion of another heat-dissipating hole 673 adjacent to the one heat-dissipating hole 673 form 60 degrees therebetween, based on the center of gravity C0 of the upper end portion of the vane hub 67.

Although the foregoing description has been given with reference to the preferred embodiments of the present disclosure, the present disclosure is not limited to the configurations of the above-described embodiments.

In addition, it should be understood that the present disclosure can be variously modified and changed by those skilled in the art to which the present disclosure pertains without departing from the spirit and scope of the present disclosure described in the claims below.

Furthermore, all or some of those embodiments may be selectively combined so that various modifications can be made.

1: Hair dryer
10: Body part
11: Air inlet
12: Air outlet
20: Handle part
30: Power supply unit
40: Heating unit
50: Controller
60: Fan motor
61: Housing
62: Stator assembly
63: Lower bracket
64: Shaft
65: Bearing
66: Impeller
67: Vane hub
621: Tooth
622: Heat-dissipating channel
641: Permanent magnet
671: Vane
672: Through hole
673: Heat-dissipating hole

The invention claimed is:

1. A fan motor comprising:

a stator assembly formed in a cylindrical shape extending in one direction and having a plurality of teeth therein;

a vane hub formed to surround a side surface and an upper end portion of the stator assembly, and having vanes protruding from an outer circumferential surface thereof, and a through hole formed through an upper end portion thereof;

a shaft coupled to the stator assembly and the through hole of the vane hub, to be rotatable relative to the stator assembly and the vane hub; and an impeller disposed on an upper side of the vane hub, and coupled to the shaft to rotate together with the shaft, wherein each of the teeth extends in the one direction along an inner circumferential surface of the stator assembly and wound with a coil, wherein the stator assembly has heat-dissipating channels each formed in a space defined by the inner circumferential surface of the stator assembly and two adjacent teeth, wherein the vane hub includes a heat-dissipating hole formed through an upper end portion thereof with being spaced apart from the through hole, wherein the heat-dissipating hole overlaps one of the heat-dissipating channels in the one direction, wherein the heat-dissipating hole is disposed in an inner area of an outer circumference of the impeller, and wherein an axial cross section of an outer circumference of the vane hub and an axial cross section of the outer circumference of the impeller face each other and form a gap therebetween.

2. The fan motor of claim 1, wherein the heat-dissipating hole is provided in plurality in the vane hub, and wherein a number of heat-dissipating holes provided in the vane hub is equal to a number of teeth disposed in the stator assembly.

3. The fan motor of claim 2, wherein the number of teeth provided in the stator assembly is a multiple of three.

4. The fan motor of claim 1, further comprising a housing surrounding side surfaces of the vane hub and the impeller, wherein a main flow path is defined in a space between an outer circumferential surface of the impeller and an inner circumferential surface of the housing and a space between an outer circumferential surface of the vane hub and an inner circumferential surface of the housing, wherein a returning flow path is defined in the heat-dissipating channels, the heat-dissipating hole, and a space between the vane hub and the impeller, and wherein the returning flow path joins the main flow path.

5. The fan motor of claim 1, wherein a cross-sectional area of the heat-dissipating hole is larger than or equal to a cross-sectional area of each heat-dissipating channel.

6. The fan motor of claim 5, wherein the heat-dissipating hole is provided in plurality in the vane hub, and wherein an area of an outer circumference of a space defined between the vane hub and the impeller is larger than or equal to a sum of cross-sectional areas of the plurality of heat-dissipating holes.

7. The fan motor of claim 5, wherein a shortest distance between an outer circumference of the vane hub and an outer circumference of the heat-dissipating hole is 1 mm or more.

8. The fan motor of claim 7, wherein a shortest distance between an outer circumference of the through hole and an outer circumference of the heat-dissipating hole is 1 mm or more.

9. The fan motor of claim 8, further comprising a bearing disposed between the shaft and the vane hub, coupled to each of the shaft and the vane hub, and formed in an annular shape.

10. The fan motor of claim 9, wherein a shortest distance between an outer circumference of the bearing and an outer circumference of the heat-dissipating hole is 1 mm or more.

11. The fan motor of claim 1, wherein a cross-section of the heat-dissipating hole is rounded rather than angular.

12. The fan motor of claim 1, wherein a cross-section of the heat-dissipating hole has a shape corresponding to a cross-section of at least one of the heat-dissipating channels.

13. The fan motor of claim 1, wherein the vane hub is formed such that an outer edge of an upper end portion thereof is chamfered.

14. A hair dryer comprising:

a body part formed in a cylindrical shape extending in one direction, having inner and outer diameters reduced from one side to another side thereof, and having a hollow portion therein;

a handle part formed in a cylindrical shape extending in another direction, disposed beneath the body part, and coupled to the body part;

a fan motor including a stator assembly, a vane hub, a shaft, and an impeller, and accommodated in one of the body part and the handle part;

a controller configured to control an operating state of the fan motor; and a power supply unit electrically connected to the fan motor and the controller to supply electric energy to the fan motor and the controller, wherein the stator assembly is formed in a cylindrical shape extending in one direction and has a plurality of teeth therein, wherein the vane hub is formed to surround a side surface and an upper end portion of the stator assembly, and includes a through hole and a heat-dissipating hole formed through the upper end portion thereof, the through hole and the heat-dissipating hole being spaced apart from each other, wherein the shaft is coupled to the stator assembly and the through hole of the vane hub, wherein the impeller is disposed on an upper side of the vane hub and coupled to the shaft, wherein each of the teeth extends in the one direction along an inner circumferential surface of the stator assembly and wound with a coil, wherein the stator assembly has heat-dissipating channels each formed in a space defined by the inner circumferential surface of the stator assembly and two adjacent teeth, wherein the heat-dissipating hole overlaps one of the heat-dissipating channels in the one direction, wherein the heat-dissipating hole is disposed in an inner area of an outer circumference of the impeller, and wherein an axial cross section of an outer circumference of the vane hub and an axial cross section of the outer circumference of the impeller face each other and form a gap therebetween.

15. The hair dryer of claim 14, wherein a number of teeth provided in the stator assembly is a multiple of three, wherein the heat-dissipating hole is provided in plurality in the vane hub, and wherein a number of heat-dissipating holes provided in the vane hub is equal to the number of teeth disposed in the stator assembly.

16. The hair dryer of claim 14, wherein a cross-sectional area of the heat-dissipating hole is larger than or equal to a cross-sectional area of each heat-dissipating channel.

17. The hair dryer of claim 14, wherein the heat-dissipating hole is provided in plurality in the vane hub, and wherein an area of an outer circumference of a space defined between the vane hub and the impeller is larger than or equal to a sum of cross-sectional areas of the plurality of heat-dissipating holes.

18. The hair dryer of claim 14, wherein a cross-section of the heat-dissipating hole is rounded rather than angular.

19. The hair dryer of claim 14, wherein a cross-section of the heat-dissipating hole has a shape corresponding to a cross-section of at least one of the heat-dissipating channels.

20. The hair dryer of claim 14, wherein the vane hub is formed such that an outer edge of an upper end portion thereof is chamfered.

* * * * *